United States Patent [19]

Akamine

[11] 3,863,269

[45] Jan. 28, 1975

[54] GUIDE DRUM APPARATUS FOR A VIDEO TAPE RECORDER AND/OR PLAYER

[75] Inventor: Takenori Akamine, Neyagawa, Japan

[73] Assignee: Matsushita Electric Industrial Co., Ltd., Osaka, Japan

[22] Filed: July 27, 1973

[21] Appl. No.: 383,145

[30] Foreign Application Priority Data

Aug. 18, 1972 Japan .............................. 47-83016

[52] U.S. Cl. .................... 360/128, 360/84, 360/107, 360/130

[51] Int. Cl. ......................... G11b 5/52, G11b 21/04

[58] Field of Search ............ 179/100.2 T, 100.2 ZA; 360/128, 130, 84, 85, 107

[56] References Cited

UNITED STATES PATENTS

| | | | |
|---|---|---|---|
| 2,964,594 | 12/1960 | Bechner et al. | 179/100.2 T |
| 3,075,049 | 1/1963 | Gordon et al. | 179/100.2 T |
| 3,243,798 | 3/1966 | Senders | 179/100.2 T |
| 3,333,753 | 8/1967 | Streets | 179/100.2 T |
| 3,436,491 | 4/1969 | Quinn et al. | 179/100.2 T |
| 3,614,338 | 10/1971 | Bogels | 179/100.2 T |
| 3,643,038 | 2/1972 | Sato | 179/100.2 T |
| 3,681,539 | 8/1972 | Eibensteiner | 179/100.2 ZA |

*Primary Examiner*—Stanley M. Urynowicz, Jr.
*Assistant Examiner*—Robert S. Tupper
*Attorney, Agent, or Firm*—Wenderoth, Lind & Ponack

[57] ABSTRACT

A guide drum apparatus for a magnetic tape comprises a first guide drum rotatable at a predetermined rotational speed and having a plurality of magnetic heads, and a second guide drum mounted coaxially with the first guide drum and rotatable independently therefrom. The first and second guide drum have tape guiding portions respectively which are opposed to each other to guide the magnetic tape therebetween. The tape is scanned by the magnetic heads with rotation of the first guide drum while the second guide drum rotates in conjunction with the tape movement.

3 Claims, 3 Drawing Figures

GUIDE DRUM APPARATUS FOR A VIDEO TAPE RECORDER AND/OR PLAYER

BACKGROUND OF THE INVENTION

This invention relates to a guide drum apparatus for a magnetic tape, and more particularly to a guide drum apparatus for guiding a magnetic tape around a periphery thereof for the purpose of recording and/or reproducing video signals on the tape.

A guide drum apparatus according to the present invention can be preferably applied to a video tape recorder or a video player in which a field or a frame of video signals is successively recorded in the longitudinal direction of a magnetic tape one by one, and the video signals are reproduced by magnetic heads mounted on the guide drum apparatus while the tape is moving around a periphery of the guide drum.

In such video equipment, a plurality of video heads are alternately brought into and out of contact with the tape during their rotation at a high speed. That is, while one of the video heads rotates out of contact with the tape, another video head rotates in contact with the tape. In this case, when the head is brought into contact with the tape, one of the video heads hits the tape at a high speed while another video head is scanning the tape. This causes a sudden vibration on the tape which may cause jitter or level fluctuation in video signals. Therefore, distortion or lack of uniformity may be produced on a picture image reproduced on a television screen. Therefore, conventionally it is difficult for such video equipment to obtain good quality of a picture image.

SUMMARY OF THE INVENTION

It is, therefore, an object of the present invention to provide a novel and improved guide drum apparatus for a magnetic tape.

Another object of the present invention is to provide an improved guide drum apparatus suitable for a video tape recorder or a video tape player in which good quality of a picture image can be obtained.

Still another object of the invention is to provide an improved guide drum apparatus for guiding a magnetic tape to move the same precisely and smoothly around the guide drum.

Still another object of the invention is to provide an improved guide drum apparatus which is reliable in operation for wrapping the magnetic tape around the guide drum.

These objects are achieved by providing a guide drum apparatus for a magnetic tape according to the present invention which comprises a first guide drum adapted to be rotated at a predetermined rotational speed and having a plurality of magnetic heads and a second guide drum mounted coaxially with the first guide drum and rotatable independently therefrom. The first and second guide drums have tape guiding portions formed at the peripheries thereof, respectively which are opposed to each other to guide the magnetic tape therebetween, whereby the tape is scanned by magnetic heads with the rotation of the first guide drum while the second guide drum rotates in conjunction with the tape movement.

BRIEF DESCRIPTION OF THE DRAWINGS

Further objects and advantages will become apparent from the following detailed description considered with reference to the accompanying drawings, in which.

DETAILED DESCRIPTION OF THE PREFERRED EMBODIMENT

Figure 1:
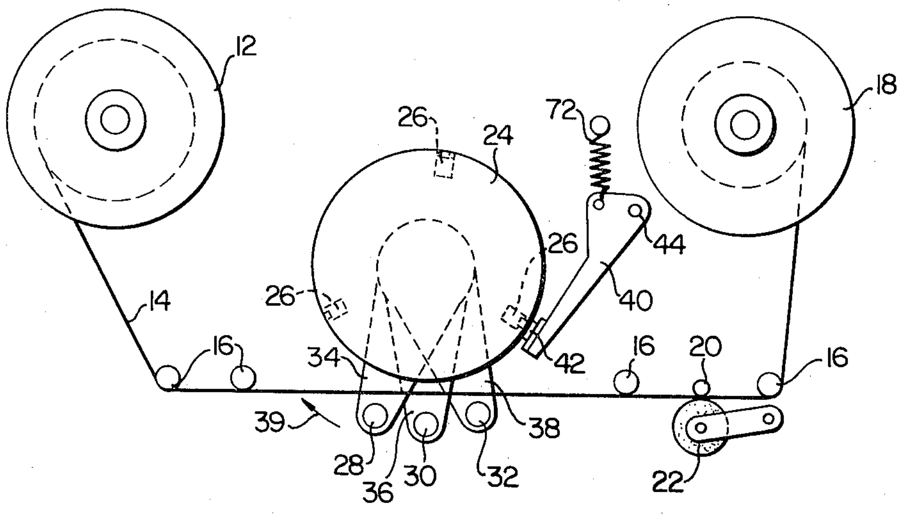
FIG.1 is a schematic plane view of a guide drum apparatus according to the present invention.

Referring now to the drawings there will be explained one embodiment of a guide drum apparatus according to the present invention.

With reference to Fig. 1, a magnetic tape designated by a reference numeral 14 drawn out from a supply reel 12 is guided by guide pins 16 and is wrapped on a takeup reel 18. The tape 14 can be moved from the supply reel 12 to the takeup reel 18 by a capstan 20 and a pressure roller 22 which is adapted to be pressed against the capstan 20.

Figure 2:
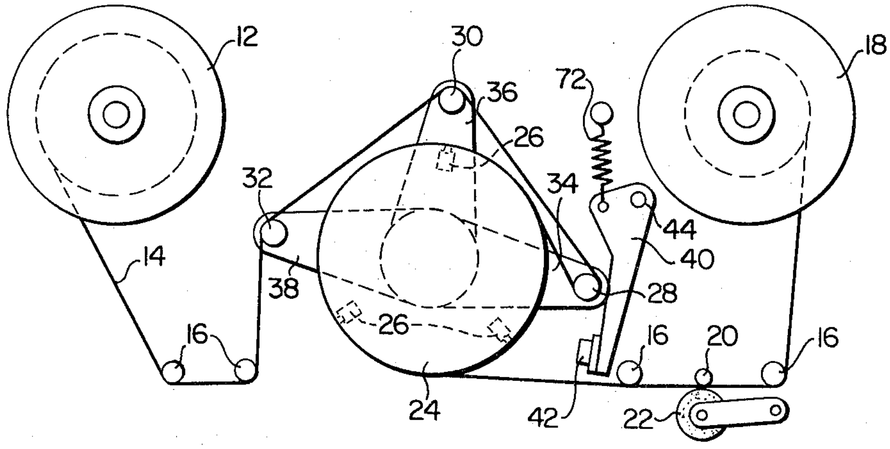
FIG. 2 is a schematic plan view of a guide drum apparatus similar to FIG. 1, wherein a magnetic tape is wrapped around guide drums.

A guide drum apparatus 24 has three magnetic video heads 26 which are equally spaced therearound. Tape wrapping pins 28,30 and 32 are secured on corresponding arms 34,36 and 38, respectively. The arms 34,36,38 are swingably mounted on a central axis of the guide drum apparatus 24. In accordance with the swinging motion of the arms 34,36,38 in the direction of an arrow 39, the tape 14 is wrapped around the guide drum apparatus 24 by an angle of more than 240°, as shown in FIG. 2.

Figure 3:
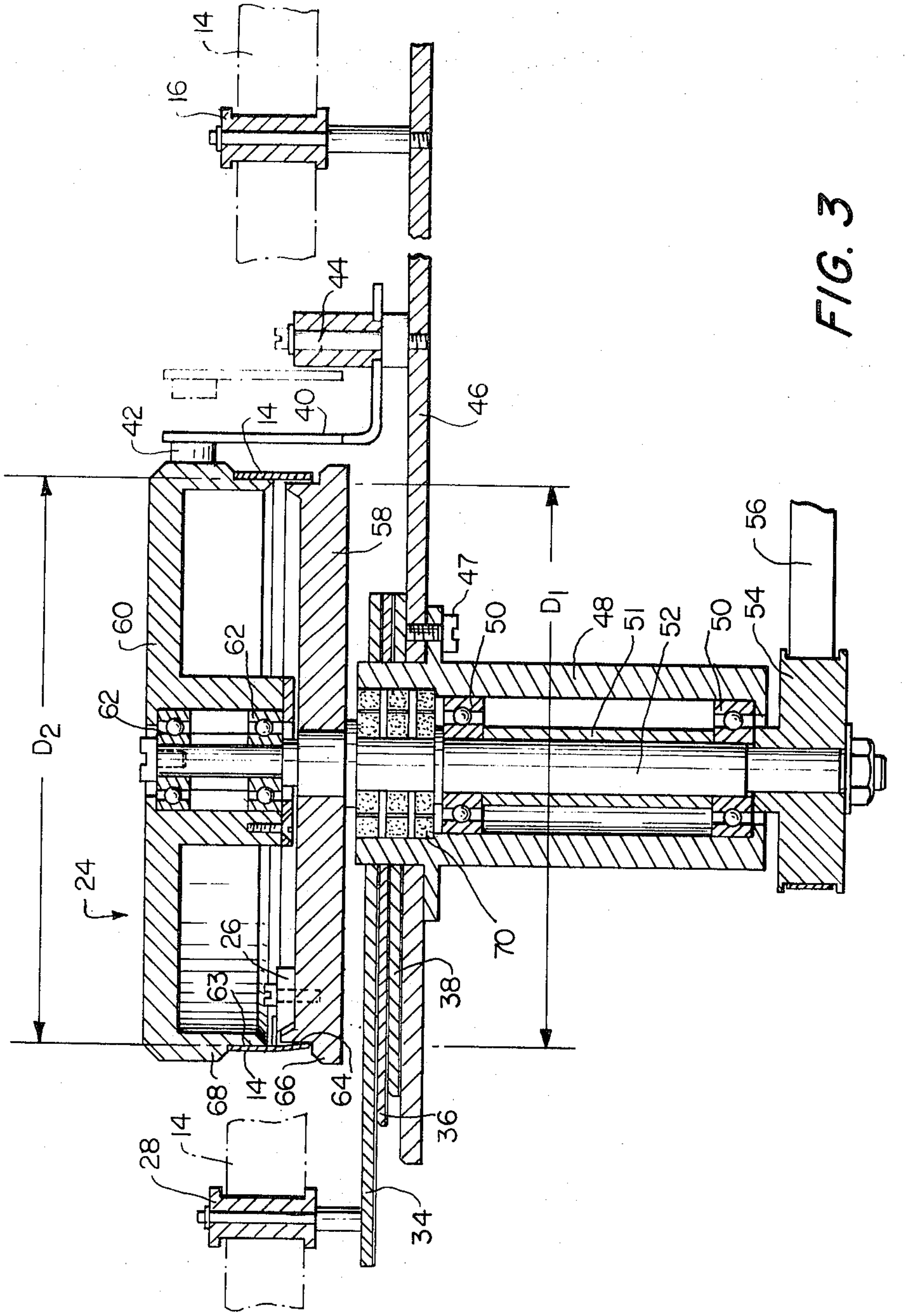
FIG. 3 is a sectional and elevational view of the guide drum apparatus according to the invention.

Referring to FIG. 3 there will be explained the detailed structure of the guide drum apparatus 24 hereinafter. A housing 48 is secured on a chassis 46 by screws 47. A main shaft 52 is rotatably supported by a pair of ball bearings 50. The ball bearings are separated from each other by a spacer sleeve 51. A pulley 54 is fixed at a lower portion of the main shaft 52, and it is driven by a motor (not shown) through an endless belt 56.

The guide drum apparatus 24 mainly comprises a first guide drum 58 fixed at the upper portion of the main shaft 52, and a second guide drum 60 rotatably mounted on the upper portion of the main shaft 52 by a pair of ball bearings 62. The first guide drum 58 rotates with the main shaft 52 at a rate of 1,200 r.p.m., while the second guide drum 60 freely rotates independently from the first guide drum 58. The guide drums 58 and 60 have tape guiding portions 63 and 64 formed at the periphery thereof, respectively. The tape guiding portions 58 and 60 are opposed to each other so as to guide the magnetic tape 14 therebetween. The guide drums 58 and 60 also have a first flange 66 and a second flange 68 formed integrally beyond the tape guiding portions 63 and 64, respectively. While the tape is wrapped around the guide drums 58 and 60 downward movement of the tape 14 is regulated by the first flange 66 not to slip down from the tape guiding portions 63 and 64. Upward movement of the tape 14 is also regulated by the second flange 68 so as to be maintained at a precise position during the horizontal movement of the tape 14 around the guide drums 58 and 60.

It is arranged that the diameter $D_2$ of the tape guiding portion 63 of the second guide drum 60 is slightly larger than the diameter $D_1$ of the tape guiding portion 64 of the first guide drum 58, so that when the tape 14 is wrapped around the guide drums 58 and 60, the tape 14 is pressed against the second guide drum 60 more strongly than against the first guide drum 58.

For material or surface finishing of the guide drums 58 and 60, it is selected that frictional coefficient $\mu_2$ between the tape guiding portion 63 of the second guide drum 60 and the tape 14 be larger than frictional coefficient $\mu_1$ between the tape guiding portion 64 of the first guide drum 58 and the tape 14. For example, the surface of the tape guiding portion 64 of the first guide drum 58 is coated with polytetrafluoro ethylene, and the surface of the tape guiding portion 63 of the second guide drum 60 is coated with rubber. In this case, $\mu_2$ is obviously larger than $\mu_1$.

When the tape 14 is moved by the capstan 20 and the pressure roller 22 after the tape 14 has been wrapped around the guide drum apparatus 24 by the tape wrapping pins 28,30,32, as shown in FIG. 2, the second guide drum 60 is driven by the tape 14 due to the friction therebetween. Accordingly, the second guide drum 60 rotates due to the tape movement while the first guide drum 58 is rotating at a high speed with the rotation of the main shaft 52.

Three magnetic video heads 26 are fixedly mounted on the first guide drum 58, as shown in FIG. 3. These heads are adapted to contact with the tape 14 wrapped around the guide drums 58 and 60 at the position between the tape guiding portions 63 and 64. Output signals from the rotating video heads 26 are taken out through rotary transformers 70.

As described above, the tape 14 is wrapped around the guide drums 58 and 60 by an angle of more than 240°, as shown in FIG. 2. Therefore, two of the video heads 26 are always in contact with the tape 14 while the other video head is not in contact with the tape 14. In this embodiment, longitudinally recorded signals, such as field of the video signals, are successively scanned by the video heads 26 one after another so that the still picture image can be displayed on a TV screen.

The tape 14 is firmly pressed around the second guide drum 60 while the tape 14 is moving so that the second guide drum 60 rotates with the tape movement without any slip between the tape 14 and the second guide drum 60. Accordingly, when one of the video heads 26 is brought into contact with the tape 14, the vibration on the tape 14 caused by the contact of the video head 26 can be absorbed by the inertia of the second guide drum 60 and the friction between the tape 14 and the second guide drum 60. Therefore, the vibration is not transmitted to the position where the other video heads 26 are just scanning.

On the other hand, since the diameter of the tape guiding portion 63 of the second guide drum 60 is slightly larger than the diameter of the tape guiding portion 64 of the first drum 58, as described above, air flow can be easily introduced between the tape 14 and the tape guiding portion 64 of the first guide drum 58. In addition, the frictional coefficient between the tape 14 and the tape guiding portion 64 of the first guide drum 58 can be set at a lower value. Therefore, the first guide drum 58 can rotate smoothly at a high speed, and the tape 14 can move smoothly around the drums 58 and 60. This eliminates not only jitter in video signals but also wow-flutter in audio signals.

In FIG. 1, a brake arm 40 is pivotally mounted on a shaft 44, and arm 40 is biased in a clockwise direction around shaft 44 by a tension spring 72 so as to press a brake shoe 42 against the second flange 68 of the second guide drum 60 when the tape 14 is not wrapped around the guide drums 58 and 60.

With the rotation of the first guide drum 58 at a high speed, the second guide drum 60 is also apt to rotate through the ball bearings 62. If the tape 14 is wrapped around the guide drums 58 and 60 while the second guide drum 60 is rotating, the second guide drum 60 is instantaneously stopped by the brake action due to the friction between the tape 14 and the second guide drum 60. Upon a shock caused by the sudden stop of the second guide drum 60, the tape 14 may be injured by the excess tension imparted thereto. Therefore, the second guide drum 60 is braked by the brake arm 40 while the tape 14 is not being wrapped around the guide drums 58 and 60. When the tape 14 is wrapped around the guide drums 58 and 60, the arm 34 causes the brake arm 40 to swing about shaft 44' in a clockwise direction so that the brake shoe 42 is disengaged from the second guide drum 60, as shown in FIG. 2. Therefore, the second guide drum 60 is brought to the freely rotatable condition, and rotates with the tape movement.

It is apparent that various modifications may be made without departing from the substantial properties in the invention. The above described specific example is intended merely to illustrate the various facets in certain selective embodiments of the invention, the scope of which shall be limited only by the following claims.

What is claimed is:

1. A guide drum apparatus for use in a video tape recorder and/or player in which a field or a frame of video signal is recorded in the longitudinal direction of a moving magnetic tape, and the recorded video signal is reproduced while the tape is moving, said apparatus comprising:

a first guide drum having a tape guiding portion formed at the periphery thereof, and having a plurality of magnetic video heads mounted thereon;

supporting means for rotatably supporting said first guide drum;

driving means for rotating said first guide drum at a rotational speed greater than the speed of movement of the tape;

a second guide drum mounted coaxially with said first guide drum and rotatable independently of said first guide drum, said second guide drum having a tape guiding portion which is formed at the periphery thereof and which is opposed to the tape guiding portion of said first guide drum so as to guide the magnetic tape therebetween; and the diameter of the tape guiding portion of said second guide drum being larger than the diameter of the tape guiding portion of said first guide drum, so that said second guide drum is rotated at a lower rotational speed than that of said first guide drum by contact with the moving tape, while said first guide drum rotates at said greater rotational speed, whereby while moving around said guide drums the magnetic tape is scanned by said magnetic video heads.

2. A guide drum apparatus as claimed in claim 1, wherein the frictional coefficient between said tape guiding portion of said second guide drum and the magnetic tape is larger than the frictional coefficient between said tape guiding portion of said first guide drum and the magnetic tape.

3. A guide drum apparatus as claimed in claim 1, wherein said apparatus further comprises tape wrapping means for wrapping the magnetic tape around said tape guiding portions of said first and second guide drums; brake means for engaging said second guide drum to brake the same while the magnetic tape is out of engagement with said second drum; and means for moving said brake means out of engagement with said second guide drum after the magnetic tape has been wrapped around said tape guiding portions of said first and second guide drums by said wrapping means.

* * * * *